(12) United States Patent
Henry et al.

(10) Patent No.: US 10,633,592 B2
(45) Date of Patent: Apr. 28, 2020

(54) THERMAL REACTOR SYSTEMS AND METHODS

(71) Applicant: Georgia Tech Research Corporation, Atlanta, GA (US)

(72) Inventors: Asegun Henry, Atlanta, GA (US); Caleb Amy, Atlanta, GA (US); Malavika Bagepalli, Atlanta, GA (US); Daniel Budenstein, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 247 days.

(21) Appl. No.: 15/799,280

(22) Filed: Oct. 31, 2017

(65) Prior Publication Data

US 2018/0122519 A1    May 3, 2018

Related U.S. Application Data

(60) Provisional application No. 62/414,878, filed on Oct. 31, 2016.

(51) Int. Cl.
    *C10B 49/14*  (2006.01)
    *C01B 3/24*   (2006.01)
    *C10J 3/57*   (2006.01)

(52) U.S. Cl.
    CPC ............... *C10B 49/14* (2013.01); *C01B 3/24* (2013.01); *C10J 3/57* (2013.01); *C01B 2203/1241* (2013.01); *Y02E 30/39* (2013.01)

(58) Field of Classification Search
    CPC . C10J 3/57; C10B 47/26; C10B 49/14; C01B 3/24; C01B 2203/1241; Y02E 30/39
    See application file for complete search history.

(56) References Cited

U.S. PATENT DOCUMENTS 2,015,085 A * 9/1935 Oberle ................ C10B 49/14
                                                  201/11
2,730,488 A * 1/1956 De Rosset ........... C10B 49/14
                                                  208/125

(Continued)

FOREIGN PATENT DOCUMENTS

JP    1988294494    * 12/1988  ............. F28F 1/32
JP    A1988294494   * 12/1988  ............. F28F 1/32

OTHER PUBLICATIONS

JPA1988294494_ENG (J Pat Plat machine translation of Tadashi, accessed on Sep. 21, 2019) (Year: 1988).*

(Continued)

*Primary Examiner* — Youngsul Jeong
*Assistant Examiner* — Gabriel E Gitman
(74) *Attorney, Agent, or Firm* — Troutman Sanders LLP; Ryan A. Schneider

(57) ABSTRACT

An exemplary embodiment of the present invention provides a reactor system comprising: a reaction vessel comprising a reactant, a heat transfer fluid and a first reaction product, wherein the heat transfer fluid has a greater density than the first reaction product such that at least a portion of the first reaction product floats on a surface of the heat transfer fluid; a first outlet positioned at a surface level of the first reaction product, the first outlet configured to output a first outlet flow comprising at least a portion of the first reaction product and at least a portion of the heat transfer fluid; wherein the heat transfer fluid is configured to provide thermal energy to the reactant in the reaction vessel to form the first reaction product.

22 Claims, 2 Drawing Sheets

(56) References Cited

U.S. PATENT DOCUMENTS

| | | | | |
|---|---|---|---|---|
| 6,346,221 B1* | 2/2002 | Wagner | ............... | B08B 15/02 |
| | | | | 202/218 |
| 2012/0168127 A1* | 7/2012 | Abughazaleh | ........... | C10K 1/02 |
| | | | | 165/104.13 |

OTHER PUBLICATIONS

JPA1988294494_ENG (J Pat Plat machine translation of Tadashi) (Year: 1988).*

* cited by examiner

THERMAL REACTOR SYSTEMS AND METHODS

CROSS-REFERENCE TO RELATED APPLICATIONS

This application claims the benefit of U.S. Provisional Patent Application Ser. No. 62/414,878, filed Oct. 31, 2016, entitled "Methane Cracking Using a High Temperature Liquid Tin Based Reactor/Heat Exchanger," the entire contents and substance of which are hereby incorporated by reference as if fully set forth below.

STATEMENT REGARDING FEDERALLY SPONSORED RESEARCH

This invention was made with government support under grant number DE-AR0000339 awarded by the Department of Energy. The government has certain rights in this invention.

BACKGROUND

Current production of hydrogen ($H_2$) emits carbon dioxide ($CO_2$), but an alternative is to use heat to directly decompose methane ($CH_4$) at high temperatures (700-1400° C.), which can be cleaner and cheaper. $H_2$ is primarily used to manufacture ammonia for fertilizer (e.g., food production), as well as in refinery processes for polymers and methanol. Global $H_2$ production is responsible for approximately ~5% of global $CO_2$ emissions. The problem is that the direct decomposition of methane approach has been stifled by the formation of solid carbon products that eventually plug the reactor.

The current process for producing $H_2$ from $CH_4$ and water ($H_2O$) fundamentally relies on a thermodynamic driving force to form $CO_2$ and to liberate $H_2$. Since current methods emit $CO_2$ and are not penalized for this externality, the cost of producing $H_2$ is very low, and has been extremely difficult for alternative processes to compete with. There are other ways, however, of producing $H_2$, such as the direct thermal cracking of $CH_4$, which does not produce $CO_2$ and instead yields solid carbon C(s) (e.g., carbon black (CB)) as a side product, which is much more lucrative than $CO_2$. In the direct thermal cracking of $CH_4$, the decomposition reaction occurs completely above 1400° C. and is driven by the increased entropy associated with obtaining two gaseous molecules ($2 \cdot H_2$) instead of one ($CH_4$), and also the strong bonds associated with solid carbon phase. The problem with this approach is that conversion of a gas to another gas with a solid byproduct is inherently problematic, because one must contain the gasses within some type of solid vessel and the solid byproduct will deposit on the solid vessel walls. This leads to eventual failure of the reactors as the solid byproduct build-up eventually clogs and blocks the flow path for the gasses, effectively plugging the reactor. Thus, the primary issue with direct thermal cracking of methane has been the plugging problem. The inability to make a reactor that operates continuously with a long lifetime is the key issue, because the economics of thermal $CH_4$ cracking are highly favorable.

SUMMARY

An embodiment of the present disclosure provides a reactor system that can comprise a reaction vessel that can comprise a reactant, a heat transfer fluid and a first reaction product, wherein the heat transfer fluid can have a greater density than the first reaction product such that at least a portion of the first reaction product can float on a surface of the heat transfer fluid. In an embodiment, the reactor system can comprise a first outlet positioned at a surface level of the first reaction product, the first outlet can be configured to output a first outlet flow that can comprise at least a portion of the first reaction product and at least a portion of the heat transfer fluid. In an embodiment, the heat transfer fluid can be configured to provide thermal energy to the reactant in the reaction vessel to form the first reaction product. In an embodiment, the heat transfer fluid can be a liquid metal. In an embodiment, the liquid metal can be selected from the group consisting of liquid tin, liquid gallium, liquid indium, liquid lead, liquid bismuth, liquid aluminum, and liquid silicon. In an embodiment, the reaction vessel can comprise a material stable at a temperature of from about 1000° C. to about 3000° C. In an embodiment, the reaction vessel can comprise a material selected from the group consisting of a ceramic, a carbon allotrope, and a carbon composite. In an embodiment, the reactant can be a gas and the first reaction product can be at least one solid. In an embodiment, the reactant can be methane and the first reaction product can be at least one of carbon black and pyrolytic carbon.

In an embodiment, the reaction vessel can further comprise a second reaction product and the reactor system can further comprise a first heat exchanger that can comprise a first outlet flow, and the first outlet flow can be at a first temperature. In an embodiment, the reactor system can further comprise a first inlet flow that can comprise at least a portion of the heat transfer fluid recirculated from the first outlet flow, and the first inlet flow can be at a second temperature less than the first temperature. In an embodiment, the thermal energy in the first outlet flow can be transferred to the first inlet flow stream.

In an embodiment, the reactor system can further comprise a second heat exchanger that can comprise a second outlet flow that can comprise at least a portion of the second reaction product received from the reaction vessel, and the second outlet flow can be at a third temperature. In an embodiment, the reactor system can further comprise a third outlet flow comprising at least a portion of the heat transfer fluid that can be received from the reaction vessel, the third outlet flow can be at a fourth temperature less than the third temperature. In an embodiment, the reactor system can further comprise a second inlet flow that can comprise at least a portion of the heat transfer fluid that can be recirculated from the third outlet flow stream, and the second inlet flow can be at a fifth temperature greater than the fourth temperature and less than the third temperature. In an embodiment, thermal energy from the second outlet flow can be transferred to the second inlet flow stream.

In an embodiment, the reaction vessel can further comprise a first inlet that can receive the reactant; a second inlet that can receive at least a portion of the heat transfer fluid from the second inlet flow; a third inlet that can receive at least a portion of the heat transfer fluid from the second inlet flow; a second outlet that can provide the second outlet flow to the second heat exchanger; and a third outlet that can provide the third outlet flow to the heat exchanger.

In an embodiment, the first heat exchanger can comprise a first channel that can comprise the first outlet flow, the first channel can comprise a plurality of protrusions extending from interior side walls of the first channel, the protrusions can be configured to reduce contact between at least a portion of the first reaction product of the first outlet flow and at least a portion of the interior side walls of the first channel.

In an embodiment, the first channel can be configured to reduce contact between at least a portion of the first reaction product of the first outlet flow and at least a portion of the interior side walls of the first channel by producing eddy currents within the first channel. In an embodiment, the first channel can be positioned at an angle sufficient to promote gravitationally driven flow of the first outlet flow.

In an embodiment, the first heat exchanger can further comprise a second channel that can comprise the first inlet flow, and the second channel can be in thermal communication with the first channel to facilitate the transfer of thermal energy from the first outlet flow to the first inlet flow. In an embodiment, the first heat exchanger can further comprise a first recovery vessel, the first recovery vessel can comprise: a first inlet that can receive the first outlet flow, and the first inlet can be in fluid communication with the first outlet of the reaction vessel. In an embodiment, the first heat exchanger can further comprise a first outlet that can provide at least a portion of the first reaction product from the first outlet flow and a second outlet that can provide at least a portion of the heat transfer fluid from the first outlet flow to the first inlet flow. In an embodiment, the second outlet can be in fluid communication with the second inlet of the reaction vessel.

In an embodiment, the second heat exchanger can comprise: a first inlet that can receive at least portion of the second reaction product from the second outlet flow, and the first inlet can be in fluid communication with the second outlet of the reaction vessel. In an embodiment, the second heat exchanger can comprise a second inlet for receiving at least a portion of the heat transfer fluid from the third outlet flow, and the second inlet can be in fluid communication with the third outlet of the reaction vessel. In an embodiment, the second heat exchanger can comprise a first outlet that can provide at least a portion of the heat transfer fluid from the third outlet flow to the second inlet flow, and the first outlet can be in fluid communication with the third inlet of the reaction vessel. In an embodiment, the second heat exchanger can comprise a second outlet that can callow at least a portion of the second reaction product from the second outlet flow to exit the second heat exchanger.

In an embodiment, the second inlet of the second heat exchanger can be configured to provide liquid droplets of at least a portion of the heat transfer fluid from the third outlet flow to the second heat exchanger to facilitate the transfer of thermal energy from the second outlet flow to the second inlet flow.

An embodiment of the disclosure can be a method comprising flowing a reactant into a reaction vessel; flowing a heat transfer fluid into the reaction vessel; generating a first reaction product in the reaction vessel by transferring thermal energy from the heat transfer fluid to the reactant, wherein the heat transfer fluid can have a greater density than the first reaction product such that at least a portion of the first reaction product can float on a surface of the heat transfer fluid. The method can further comprise flowing a first outlet flow to a first outlet, the first outlet flow can comprise at least a portion of the first reaction product and at least a portion of the heat transfer fluid.

In an embodiment, the method can further comprise: generating a second reaction product in the reaction vessel by transferring thermal energy; flowing the first outlet flow to a first heat exchanger, the first outlet flow can be at a first temperature. The method can further comprise flowing a first inlet flow to the reaction vessel, the first inlet flow can comprise at least a portion of the heat transfer fluid from the first outlet flow, the first inlet flow can be at a second temperature less than the first temperature. In an embodiment, thermal energy from the first outlet flow can be transferred to the first inlet flow. In an embodiment, the method further comprises flowing a second outlet flow to a second heat exchanger, the second outlet flow can comprise at least a portion of the second reaction product, the second outlet flow can be at a third temperature. In an embodiment, the method can further comprise flowing a third outlet flow to the second heat exchanger, the third outlet flow can comprise at least a portion of the heat transfer fluid, the third outlet flow can be at a fourth temperature less than the third temperature. In an embodiment, the method can further comprise flowing a second inlet flow to the reaction vessel, the second inlet flow can comprise at least a portion of the heat transfer fluid from the third outlet flow, the second inlet flow can be at at a fifth temperature greater than the fourth temperature and less than the third temperature.

In an embodiment, the first outlet flow can be flowed through a first channel of the first heat exchanger, the first channel can be positioned at an angle sufficient to promote gravitationally driven flow of the first outlet flow. In an embodiment, the first outlet flow can be flowed through a first channel of the first heat exchanger, the first channel can have a plurality of protrusions extending from interior side walls of the first channel, the protrusions can be configured to reduce contact between at least a portion of the first reaction product of the first outlet flow and at least a portion of the interior side walls of the first channel.

In an embodiment, flowing the second outlet flow to the second heat exchanger can comprise generating droplets of at least a portion of the heat transfer fluid from the second outlet flow within a portion of the second heat exchanger to facilitate the transfer of thermal energy from the second outlet flow to the second inlet flow.

DETAILED DESCRIPTION

Figure 1A:
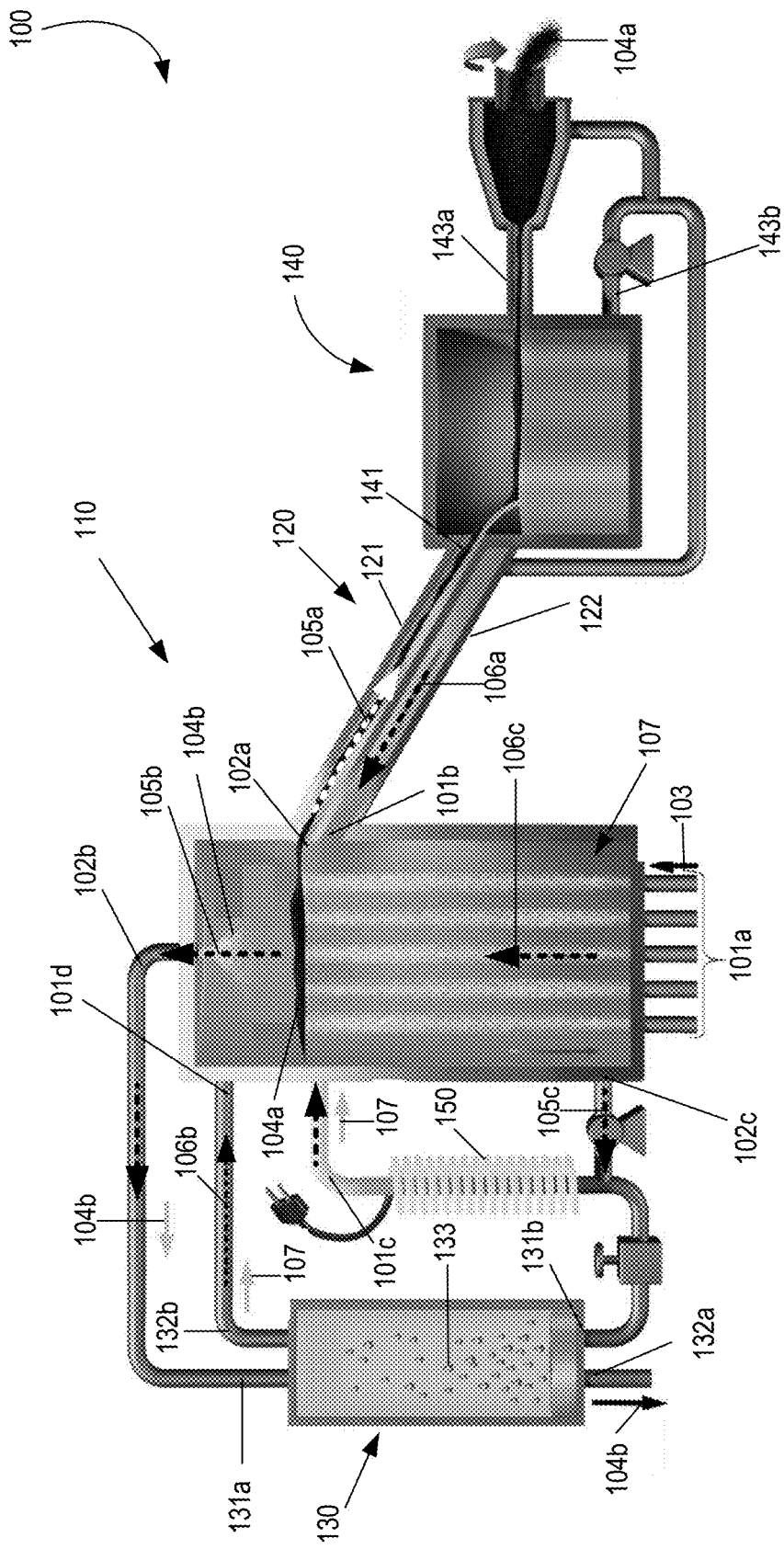
FIG. 1a is a continuous reactor system, in accordance with an embodiment of the present disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, or method steps, even if the other such compounds, material, particles, or method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Disclosed are various continuous reactor systems and methods. The presently disclosed continuous reactor systems can have the added benefit of yielding lower-cost products and decreasing emissions. Additionally, the presently disclosed continuous reactor system can be beneficial as it can minimize thermal loss and allow for increased control of the temperature, pressure, and residence time within a reaction vessel.

In an embodiment, the reactor system can comprise a reaction vessel. The reaction vessel can comprise a reactant, a heat transfer fluid, and a first reaction product. The reaction vessel can comprise a single reactant or a plurality of reactants. In an embodiment, the heat transfer fluid can have a greater density than the first reaction product such that at least a portion of the first reaction product can float on a surface of the heat transfer fluid. In an embodiment, the reaction vessel can comprise a first outlet positioned at a surface level of the first reaction product. The first outlet can be configured to output a first outlet flow that can comprise at least a portion of the first reaction product and at least a portion of the heat transfer fluid. In other words, the flow of the heat transfer fluid can effectuate movement of the first reaction product throughout the reaction vessel and throughout the reactor system.

In an embodiment, the heat transfer fluid can be configured to provide thermal energy to the reactant in the reaction vessel to form the first reaction product. In an embodiment, the heat transfer fluid can be configured to provide thermal energy to a reactant. In an embodiment, the heat transfer fluid can be configured to provide thermal energy to a plurality of reactants. The heat transfer fluid can provide thermal energy to a single reactant or to plurality of reactants to form a single reaction product, or a plurality of reaction products. In an embodiment, the heat transfer fluid can provide thermal energy to a single reactant to form a single reaction product. In an embodiment, the heat transfer fluid can provide thermal energy to a single reactant to form a plurality of reaction products. In an embodiment, the heat transfer fluid can provide thermal energy to a plurality of reactants to form a plurality of reaction products. In an embodiment, at least one of the reaction products has a density that is less than the density of the heat transfer fluid.

Turning to the figures, which solely represent example embodiments, FIG. 1a illustrates a continuous reactor system 100, in accordance with an embodiment of the present disclosure. The continuous reactor system 100 can comprise a reaction vessel 110 for containing a reaction, a first heat exchanger 120, and a second heat exchanger 130. During use, the reaction vessel 110 can comprise at least one of a reactant 103, a heat transfer fluid 107, a first reaction product 104a, and a second reaction product 104b.

In some embodiments, the reaction vessel 110 can comprise a plurality of inlets and outlets for receiving and providing one or more of the reactant 103, the heat transfer fluid 107, the first reaction product 104a, and the second reaction product 104b in various flow streams to the first and second heat exchangers 120, 130, respectively. The reaction vessel 110 can include a first inlet 101a for receiving the reactant 103. In some embodiments, the first inlet 101a can be disposed on a lower portion of the reaction vessel 110. For instance, as illustrated in FIG. 1a, the first inlet 101a can be disposed on the bottom of the reaction vessel 110. The first inlet may comprise one or more interfaces for receiving the reactant 103.

In some embodiments, the reaction vessel 110 can include a second inlet 101b. As illustrated at FIG. 1a, the second inlet 101b can be for providing at least a portion of the heat transfer fluid 107 to the reaction vessel 110. In some embodiments, the second inlet 101b can receive a first inlet flow stream 106a from the first heat exchanger 120 and a second inlet flow stream 106b from the second heat exchanger 130. The first and second inlet flow streams 106a, 106b can be heated to a desired temperature before entry into the reaction vessel 110 as described in more detail below. In some embodiments, the second inlet 101b can include an interface on a side portion of the reaction vessel 110. As such, a counterflow of heat transfer fluid 107 (via first inlet flow 106a) can be provided to the reaction vessel 110. Additionally, the reaction vessel 110 may include a third inlet 101c for receiving heat transfer fluid 107 from a heating unit 150, when necessary, and a fourth inlet 101d for delivering a portion of the heat transfer fluid 107 from the second heat exchanger 120 to the reaction vessel 110.

In some embodiments, the reaction vessel 110 can be approximately full of the heat transfer fluid 107, as illustrated at FIG. 1a. When in use, the reactant can be pumped into the heat transfer fluid 107 and the first and second inlet flow streams 106a, 106b can be provided to the reaction vessel 110 in a counterflow to a flow of the reactant via a third inlet flow stream 106c, as the reactant travels through the reaction vessel 110 from the bottom of the vessel 110 to the top of the vessel 110. The counterflow of fluid can allow for control of the residence time of the reactant 103 in the reaction vessel 110; for instance, the reactant residence time can be between 1 and 3 seconds, 1 and 5 seconds, 1 and 10 seconds, 1 second, 2, seconds, 3 seconds, 4 seconds, 5, seconds, 7 seconds, 10 seconds, at least 1 second, at least 3 seconds, at least 5 seconds, or at least 10 seconds.

Additionally, as the reactant 103 travels through the reaction vessel 110 it can react to form the first product 104a and the second product 104b. In an example embodiment, the reactant 103 may be a gaseous reactant. As the reactant 103 is heated within the reaction vessel 110, it can react and form the first reaction product 104a and the second reaction product 104b within bubbles in the heat transfer fluid 107. When the first and second products 104a, 104b reach the surface of the heat transfer fluid 107, the first reaction product 104a may collect on a surface of the heat transfer fluid 107 within the reaction vessel 110. By providing a counterflow of heat transfer fluid 107 from the second inlet 101b into the reaction vessel 110, the first reaction product 104a on the surface can be transported to the first heat exchanger 120, as discussed in more detail below.

Additionally, in some embodiments, the reaction vessel 110 can include a first outlet 102a for removing the first reaction product 104a from the reaction vessel 110 and delivering it to the first heat exchanger 120. For instance, the first reaction product 104a can be removed from the reaction vessel 110 via a first outlet flow stream 105a to the first heat exchanger 120. The first outlet flow stream 105a can include the first reaction product 104a and a portion of the heat transfer fluid 107 heated to a first temperature. As will be understood by those skilled in the art, the first temperature may be at or about a temperature within the reaction vessel 110.

In some embodiments, the reaction vessel 110 can include a second outlet 102b for removing the second reaction product 104b from the reaction vessel 110 and delivering it to the second heat exchanger 130. For instance, the second reaction product 104b may be removed via a second outlet flow 105b and delivered to the second heat exchanger 130. As will be understood by those skilled in the art, the second reaction product 104b may be heated to a third temperature, the third temperature at or about a temperature within the reaction vessel 110 such that there is minimal thermal loss between the reaction vessel 110 and the second heat exchanger 130.

In some embodiments, the reaction vessel 110 can include third outlet 102c for removing at least a portion of the heat transfer fluid 107 and delivering it to the second heat exchanger 130. For instance, the portion of the heat transfer fluid 107 may be removed as a third outlet flow 105c and pumped to either the second heat exchanger 130 or the heating unit 150. The third outlet flow 105c can be less than about a temperature within the reaction vessel 110.

As illustrated at FIG. 1a, the continuous reactor system 100 can comprise a first heat exchanger 120. The first heat exchanger 120 can be configured to facilitate a transfer of thermal energy from a first outlet flow stream 105a received from the reaction vessel 110 to the first inlet flow stream 106a, thereby heating the first inlet flow stream 106a. The first heat exchanger 120 can receive the first outlet flow stream 105a from the reaction vessel 110. The first outlet flow stream 105a can comprise at least a portion of the first reaction product 104a and at least a portion of the heat transfer fluid 107 received from the reaction vessel 110. When exiting the reaction vessel 110, the first outlet flow stream 105a can be at or about a first temperature. To facilitate heat transfer between the first outlet flow stream 105a and the first inlet flow stream 106a, the first inlet flow stream 106a can comprise at least a portion of the heat transfer fluid 107 and can be recirculated from the first outlet flow stream 105a. In other words, heat transfer fluid 107 used to transport the first reaction product 104a from the reaction vessel 110 can be pumped back to the reaction vessel 110 once the first reaction product 104a is removed.

As such, and as illustrated in FIG. 1a, the first heat exchanger 110 can include two counterflows of heat transfer fluid 107, the first flow stream (first outlet flow stream 105a) can be flowing in a direction away from the reaction vessel 110 and opposite to a second flow stream (first inlet flow stream 106a). The first flow stream can be at a first temperature that can be greater than a second temperature of the second flow stream due to a cooling off period as the second flow stream is recirculated back towards the reaction vessel 110. To facilitate an exchange of thermal energy between the first outlet flow 105a and the first inlet flow 106a, in some embodiments, the first heat exchanger 120 may include a first channel 121 in thermal communication with a second channel 122. When the two flow streams flow counter to each other, thermal energy can be transferred from the first flow stream in the first channel 121 to the second flow stream in the second channel 122, thereby heating the flow stream in the second channel 122.

Figure 1B:
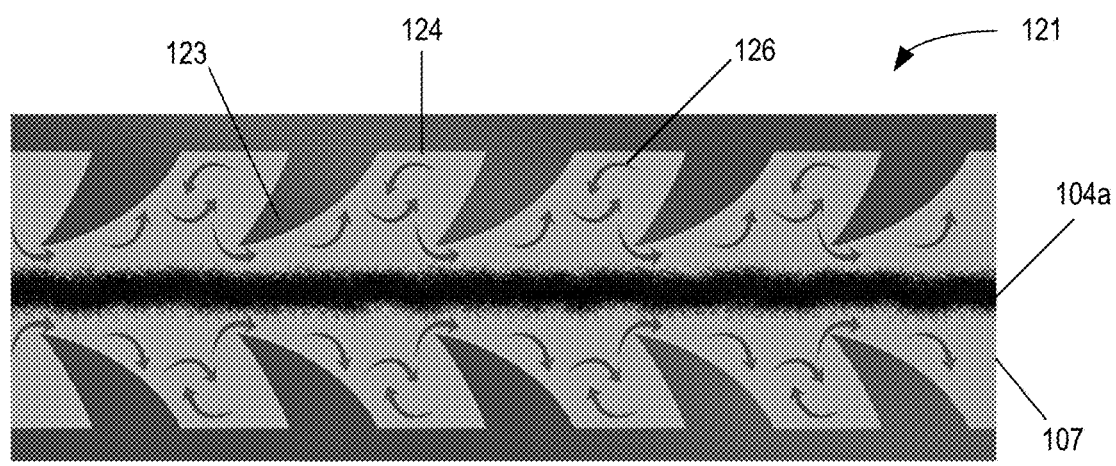
FIGS. 1b and 1c are cross-sectional views of a first channel within a first heat exchanger, in accordance with an embodiment of the present disclosure.
Figure 1C:
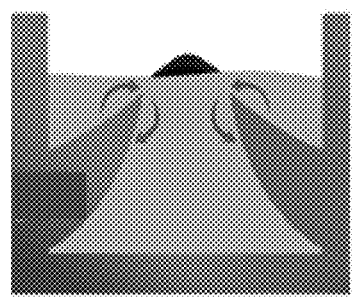

FIGS. 1b and 1c are cross-sectional views of a first channel 121 of the first heat exchanger 120, in accordance with an embodiment of the present disclosure. As illustrated at FIGS. 1b and 1c, in some embodiments, the first channel 121 can have a plurality of protrusions 123 extending from interior side walls 124 of the first channel 121. The plurality of protrusions 123 can be configured to reduce contact between at least a portion of the first reaction product 104a of the first outlet flow 105a and at least a portion of the interior side walls 124 of the first channel 121. In some embodiments, the plurality of protrusions 123 can be configured to produce eddy currents 126 within the first channel 121 that can reduce the contact between the at least a portion of the first reaction product 104a and the interior side walls 124 of the first channel 121. Including protrusions 123 on the side walls 124 can be advantageous to prevent accumulation and plugging of the continuous reactor system 100. For instance, in embodiments operating at high temperatures, generally the interior side walls 124 may be substantially hotter than an interior of the reaction vessel; however, if the walls 124 are too cold and the product is moving at a high velocity, the product may stick to the side walls and accumulate to the side walls.

In some embodiments, as illustrated at FIG. 1a, the first channel 121 can be positioned at an angle sufficient to promote gravitationally driven flow of the first outlet flow 105a. In some embodiments, the angle is at least 15 degrees, at least 20 degrees, at least 30 degrees, or at least 45 degrees, with respect to a heat transfer fluid 107 surface inside the reaction vessel 110. Additionally, in some embodiments, the second channel 122 can be positioned at an angle equivalent to that of the first channel 121 such that the first channel 121 and second channel 122 extend parallel to one another. Therefore, in some embodiments, the first inlet flow 106a traveling in the second channel 122 can be pumped up the inclined channel and towards the reaction vessel 110 and simultaneously heated due to thermal communication with the first outlet flow 105a.

In some embodiments, as illustrated at FIG. 1a, the first heat exchanger 120 can be in communication with a first recovery vessel 140. The first recovery vessel 140 can comprise a first inlet 141 for receiving the first outlet flow stream 105a. Additionally, the first recovery vessel 140 can comprise a first outlet 143a and a second outlet 143b. The first outlet 143a can provide the first reaction product 104a separated from the heat transfer fluid 107 to be collected. The second outlet 143b can be for providing at least a portion of the heat transfer fluid 107 from the first outlet flow stream 105a to the first inlet flow stream 106a, thereby recirculating the heat transfer fluid 107, as discussed above. As will be understood, the first reaction product 104a and the heat transfer fluid 107 received by the recovery vessel 140 may be cooled to a temperature less than the first temperature. Additionally, the recovery vessel 140 can include any mechanism for separating the first reaction product from the heat transfer fluid 107. For instance, the recovery vessel 140 may comprise a cyclone, centrifuge, a skimmer, and the like.

As illustrated at FIG. 1a, the continuous reactor system 100 can comprise a second heat exchanger 130. The second heat exchanger 130 can comprise a first inlet 131a for receiving a second outlet flow 105b from the reaction vessel 110, the second outlet flow 105b including at least a portion of the second reaction product 104b. The first inlet 131a can be in fluid communication with the second outlet 102b of the reaction vessel 110. The second heat exchanger 130 can further comprise a second inlet 131b for receiving at least a portion of the heat transfer fluid 107, the second inlet 131b can be in fluid communication with the third outlet 102c of the reaction vessel 110 and configured to receive a third outlet flow 105c from the reaction vessel 110. In some embodiments, the second heat exchanger 130 can comprise a first outlet 132a for allowing at least a portion of the second reaction product 104b from second outlet flow 105b to exit the second heat exchanger 130. The second heat exchanger 130 can further comprise a second outlet 132b in fluid communication with a fourth inlet 101d of the reaction vessel 110, the second outlet 132b for providing at least a portion of the heat transfer fluid 107 from the third outlet flow 105c to the fourth inlet 101d of the reaction vessel 110.

The second heat exchanger 130 can be configured to facilitate heat transfer from the second reaction product 104b in the second outlet flow 105b to the second inlet flow 106b. When received from the reaction vessel 110 via the second outlet 102b, the second outlet flow 105b can be at a third temperature. In some embodiments, the second outlet flow 105b can be delivered to the second heat exchanger 130 proximate an upper portion of the second heat exchanger 130. For instance, as illustrated at FIG. 1a, the second outlet flow 105b can be delivered to the second heat exchanger 130 at a top portion of the second heat exchanger 130. The third outlet flow 105c can comprise at least a portion of the heat transfer fluid 102 received from the reaction vessel 110 and when received by the second heat exchanger 130 can be at a fourth temperature. In some embodiments, the fourth temperature can be less than the third temperature. The second inlet flow 106b can comprise at least a portion of the heat transfer fluid 107 recirculated from the third outlet flow 105c. The second inlet flow 106b can be at a fifth temperature that can be greater than the fourth temperature and less than the third temperature. As such, when the second reaction product 104b is delivered to the second heat exchanger 130 and comes in contact with the heat transfer fluid 107, the second reaction product 104b transfers thermal energy to the heat transfer fluid 107, thereby heating it.

In some embodiments, the second heat exchanger 130 can be a liquid droplet heat exchanger. A liquid droplet heat exchanger may include a heat exchanger that relies on gravity to facilitate the exchange of thermal energy between a gas and a liquid without causing a chemical reaction between the two mediums. For example, in an embodiment, the liquid can be inert to the gas to allow for a direct-contact heat exchange. Additionally, the second inlet of the second heat exchanger 130 can be configured to provide liquid droplets 133 of at least a portion of the heat transfer fluid 107 from the third outlet flow 105c to the second heat exchanger 130 to facilitate the transfer of thermal energy from the second outlet flow 105b to the second inlet flow 106b.

In some embodiments, the reaction vessel 110 can be configured to facilitate a thermal reaction between the reactant 103 and the heat transfer fluid 107 to generate the first reaction product 104a and the second reaction product 104b. As will be understood by those skilled in the art, the continuous reactor system 100 can be used to facilitate any reaction. The reactant can be, for example, a salt, a liquid, a gas, a supercritical fluid, and the like. In an embodiment, a reaction product can be a solid. In an embodiment, a reaction product can be a gas. In an embodiment, the reaction can produce a plurality of reaction products, for example, a solid and a gas. In an embodiment, the reactant can be a gas, such as a hydrocarbon gas. In an example embodiment, the thermal reaction can be the decomposition reaction of methane into carbon black and hydrogen. As such, the first reaction product can be carbon black and the second reaction product can be hydrogen. In other embodiments, the continuous reactor system can be used to create a variety of carbon allotropes including, but not limited to, amorphous carbon, such as carbon black or pyrolytic carbon. In an embodiment, the reactant can be methane and the reaction products can be carbon black, pyrolytic carbon, and hydrogen gas.

The heat transfer fluid 107 may be any liquid capable of facilitating thermal transfer from various streams in the system 110. For instance, in some embodiments, the heat transfer fluid 107 can be a liquid metal. For instance, the liquid metal can be liquid tin, lead, gallium, indium, bismuth, aluminum, or zinc. In an embodiment, the heat transfer fluid can be selected from the group consisting of liquid tin, liquid gallium, liquid indium, liquid lead, liquid bismuth, liquid aluminum, liquid silicon, and alloys thereof. A person of ordinary skill in the art would know that the heat transfer fluid can be tailored depending on the desired reaction conditions. For example, Ga—In—Sn alloys can produce room-temperature liquid metal. The heat transfer fluid 107 may also be any liquid metal inert to the reactant. In other embodiments, the heat transfer fluid may be another liquid such as oil, water, and the like.

The reaction vessel 110, first heat exchanger 120, and second heat exchanger 130 may be composed of any material. In some embodiments, the reaction vessel 110 may be composed of a material that is not subjected to damage due to the reaction or reaction temperature. For instance, the reaction vessel 110 may be composed of a material that does not corrode during use, expand significantly due to temperature differences inside and outside the reaction vessel 110, or in other ways deform. In some embodiments, the reaction vessel 110 can be made of stainless steel, glass-lined steel, graphite, or castable cement. In an embodiment, the reaction vessel 110 can comprise a material selected from the group consisting of a ceramic, a carbon allotrope, and a carbon composite, such as a carbon fiber composite, a refractory metal such as tungsten, rhenium, and the like.

The first temperature within the reaction vessel 110 can be any temperature needed to facilitate a reaction, as understood by those skilled in the art. In an embodiment where the reaction is the decomposition of methane gas to carbon black and hydrogen gas the temperature within the reaction vessel can be approximately 1400° C. As such the first outlet flow 105a can be at a temperature of about 1400° C. or less. In an embodiment, the temperature in the reaction vessel can be from about 1000° C. to about 3000° C. In an embodiment, the temperature in the reaction vessel can be from about 1000° C. to about 1500° C. In an embodiment, the temperature in the reaction vessel can be from about 1200° C. to about 1400° C. For instance, in some embodiments the first outlet flow 105a can have first temperature as it is received from the reaction vessel 110 and decrease in temperature as 1) it's thermal energy is exchanged with a counterflow of heat transfer fluid 107 within the second channel 122 and/or 2) it moves farther away from the reaction vessel 110 and towards a recovery vessel 140, for instance. In some embodiments, the temperature of the first outlet flow 105a can decrease to a second temperature. That first outlet flow 105a can in turn be recirculated, when at the second temperature, as the first inlet flow 106a and heated in the first heat exchanger 120 back to approximately the reaction temperature. As such, those skilled in the art will understand that the temperature of the heat transfer fluid 107 may increase or decrease as the fluid moves through the continuous reaction system 110. However, despite increases or decreases in temperature, the continuous reactor system 110 has the added benefit of having minimal thermal loss. As defined herein, minimal thermal loss means less than 10% thermal loss.

As will be understood, the disclosed continuous reaction system 110 can be any size whether large scale (e.g. industrial use) or small scale (e.g. laboratory use). Additionally, one or more flow streams may be pumped through the system. Pumping of flow streams may be achieved by any method or system now known or later developed. The system may include various other known components in the art for diverting or otherwise manipulating flow streams, such as valves. Additionally, while some embodiments are described as continuous reactor systems, the reactor systems described herein can be continuous, semi-continuous, or non-continuous.

In some embodiments, the continuous reactor system 110 may include a back-up heating unit 150 that can be used to heat the heat transfer fluid 107 when necessary, for instance prior to filling the reaction vessel 110 or if the temperature in the reaction vessel 110 dips below a threshold level. The heating unit 150 may receive heat transfer fluid 107 via the third outlet 102c, heat the heat transfer fluid 107, and recirculate it back into the reaction vessel 110.

While some embodiments have been described herein with respect to a reaction vessel, a first heat exchanger, and a second heat exchanger, in an embodiment, the reactor system does not comprise a heat exchanger altogether. In an embodiment, the reactor system can comprise one heat exchanger. In an embodiment, the reactor system can comprise two, three, or more heat exchangers. In an embodiment, the reactor system can comprise a plurality of heat exchangers.

Another embodiment of the present disclosure can include a method comprising: flowing a reactant into a reaction vessel; flowing a heat transfer fluid into the reaction vessel; generating a first reaction product in the reaction vessel by transferring thermal energy from the heat transfer fluid to the reactant, wherein the heat transfer fluid can have a greater density than the first reaction product such that at least a portion of the first reaction product can float on a surface of the heat transfer fluid.

The method can further comprise flowing a first outlet flow to a first outlet, the first outlet flow can comprise at least a portion of the first reaction product and at least a portion of the heat transfer fluid. In an embodiment, the method can further comprise generating a second reaction product in the reaction vessel; flowing a first outlet flow to a first heat exchanger, the first outlet flow can comprise at least a portion of the first reaction product and at least a portion of the heat transfer fluid, the first outlet flow at a first temperature; flowing a first inlet flow to the reaction vessel, the first inlet flow can comprise at least a portion of the heat transfer fluid from the first outlet flow, the first inlet flow can be at a second temperature less than the first temperature, wherein thermal energy from the first outlet from can be transferred to the first inlet flow; flowing second outlet flow to a second heat exchanger, the second outlet flow comprising at least a portion of the second reaction product, the second outlet flow at a third temperature; flowing a third outlet flow to the second heat exchanger, the third outlet flow comprising at least a portion of the heat transfer fluid, the third outlet flow at a fourth temperature less than the third temperature; and flowing a second inlet flow to the reaction vessel, the second inlet flow comprising at least a portion of the heat transfer fluid from the third outlet flow, the second inlet flow at a fifth temperature greater than the fourth temperature and less than the third temperature. The method can include some or all of the features described above with respect to FIGS. 1a-1c.

EXAMPLE

In some embodiments, the continuous reaction system can facilitate methane cracking. For instance, the described continuous reaction system can facilitate methane cracking at a lower cost, without producing $CO_2$ as a byproduct and allow for the creation of carbon allotropes without plugging or blockage of the system due to creation of a solid product (e.g. Carbon Black (CB)) at a high temperature. The method can utilize the systems and methods described above with respect to FIGS. 1a-1c.

The system described with respect to FIGS. 1a-1c can be held in an inert environment. In some embodiments, the inert environment can be $N_2$ or Ar. The reaction vessel can be filled with liquid tin at a temperature of 1400° C. The vessel can be made from graphite or more cheaply from a castable cement, neither of which exhibit any reaction whatsoever with Sn, $CH_4$, or $H_2$ at any of the temperatures of interest. The vessel then can include an interface on the bottom whereby $CH_4$ at ~25° C. is injected as bubbles, and the bubbles rise to the top of the Sn via buoyancy. While submerged the bubbles, likely <1 cm in diameter, will quickly heat up to the temperature of the Sn (1400° C.), in less than 1 sec, as estimated from analytical solution to transient heat conduction in a sphere. Once heated, the $CH_4$ in the bubbles can decompose into 2. $H_2(g)$+CB in ~1-3 seconds for <1 cm diameter bubbles, and when the bubbles burst at the top surface of the Sn, the CB can simply float on the Sn (due to the large 3.8× density difference), while the 2. $H_2$ will continue to flow out of the system. There are then two primary technical challenges: (1) removing the floating CB without letting it touch the solid walls while hot, and (2) recovering the sensible heat in the CB and $H_2$ product streams.

To allow for recovering the sensible heat in the CB and $H_2$ product streams, a secondary flow of tin can be used to raise the level of the tin above the lip of the reactor vessel, which will cause some of the tin to spill over onto an angled off ramp channel (see FIG. 1a), which can carry with it the CB floating on its surface. In this way, the CB can be continually purged from the reactor vessel preventing it from building up to the point that it would plug the reactor. The angled channel system can contain solid protrusions, as discussed previously, that are slightly submerged, but produce eddies near the surface of the Sn that aggregate and collimate the CB flow on the surface, preventing it from coming into contact with the angled channel system walls. The angled channel system, however, can also serve a secondary purpose, which is to cool the CB via counter flow heat exchange with tin flowing in contact with the underside of the angled channel system. Here, the angled channel system can be made of graphite, because graphite and Sn exhibit no chemical interaction at any temperature as both graphite and Sn are highly thermally conductive (~30-100 W m$^{-1}$ K$^{-1}$). This then allows for the angled channel system to act as a counter-flow heat exchanger to recuperate the sensible heat in the CB and also cool it so that it can be separated from Sn(1) at lower temperatures <450° C., whereby a centrifuge/cyclone can be used to separate the CB from the Sn(1). The now cooled Sn(1) can then be reheated to the peak temperature 1400° C., as it flows uphill in contact with the underside of the angled channel system effectively recuperating the sensible heat that was stored in the CB and adding that heat to the reactor vessel.

Similarly, assuming the reactor is designed to reach >99% completion of the reaction, the sensible heat in the product $H_2$ can also be recuperated via a counter flow heat exchanger with Sn(1). The tin can be pumped through the reactor to drive the Sn(1) downward against the $CH_4$ upward flow. This can increase the $CH_4$ bubble residence time to complete the reaction (1-3 secs) and will establish counterflow heat exchange for the $CH_4$, since the gas enters cold. The coldest tin then exits at the bottom of the reactor vessel, a portion of which can be reheated by the $H_2$ product stream, via a compact liquid droplet heat exchanger. The remaining heat for the reaction (75.6 kJ/mol) can then be supplied by high temperature SiC, $MoSi_2$ or W heaters. In this way, using the system illustrated in FIG. 1a, >90% of the sensible heat in both of the products ($H_2$ & CB) can be recuperated.

The invention claimed is:

1. A reactor system comprising:
   a reaction vessel comprising a reactant, a heat transfer fluid, a first reaction product, and a second reaction product, wherein the heat transfer fluid has a greater density than the first reaction product such that at least a portion of the first reaction product floats on a surface of the heat transfer fluid;
   a first reaction vessel outlet positioned at a surface level of the first reaction product, the first reaction vessel outlet configured to output a first reaction vessel outlet flow comprising at least a portion of the first reaction product and at least a portion of the heat transfer fluid;
   a first heat exchanger comprising:
      the first reaction vessel outlet flow, the first reaction vessel outlet flow being at a first temperature; and
      a first reaction vessel inlet flow comprising at least a portion of the heat transfer fluid recirculated from the first reaction vessel outlet flow, the first reaction vessel inlet flow being at a second temperature that is less than the first temperature;
      wherein thermal energy in the first reaction vessel outlet flow is transferred to the first reaction vessel inlet flow; and
   a second heat exchanger comprising:
      a second reaction vessel outlet flow comprising at least a portion of the second reaction product, the second reaction vessel outlet flow being at a third temperature;
      a third reaction vessel outlet flow comprising at least a portion of the heat transfer fluid, the third reaction vessel outlet flow being at a fourth temperature that is less than the third temperature; and
      a second reaction vessel inlet flow comprising at least a portion of the heat transfer fluid of the third reaction vessel outlet flow, the second reaction vessel inlet flow being at a fifth temperature that is greater than the fourth temperature and less than the third temperature;
   wherein the heat transfer fluid is configured to provide thermal energy to the reactant in the reaction vessel to form the first reaction product; and
   wherein thermal energy from the second reaction vessel outlet flow is transferred to the second reaction vessel inlet flow.

2. The reactor system of claim 1, wherein the heat transfer fluid is a liquid metal.

3. The reactor system of claim 2, wherein the liquid metal is selected from the group consisting of liquid tin, liquid gallium, liquid indium, liquid lead, liquid bismuth, liquid aluminum, and liquid silicon.

4. The reactor system of claim 1, wherein the reaction vessel comprises a material stable at a temperature of from 1000° C. to 3000° C.

5. The reactor system of claim 1, wherein the reaction vessel comprises a material selected from the group consisting of a ceramic, a carbon allotrope, and a carbon composite.

6. The reactor system of claim 1, wherein the reactant is a gas and the first reaction product is at least one solid.

7. The reactor system of claim 1, wherein the reactant is methane and the first reaction product is at least one of carbon black and pyrolytic carbon.

8. The reactor system of claim 1, wherein the reaction vessel further comprises:
   a first reaction vessel inlet for receiving the reactant;
   a second reaction vessel inlet for receiving at least a portion of the heat transfer fluid from the first reaction vessel inlet flow;
   a third reaction vessel inlet for receiving at least a portion of the heat transfer fluid from a heating unit;
   a second reaction vessel outlet for providing the second reaction vessel outlet flow to the second heat exchanger; and
   a third reaction vessel outlet for providing the third reaction vessel outlet flow to the second heat exchanger.

9. The reactor system of claim 1, wherein the second heat exchanger further comprises:
   a second heat exchanger first inlet for receiving at least a portion of the second reaction product from the second reaction vessel outlet flow, the second heat exchanger first inlet being in fluid communication with the second reaction vessel outlet;
   a second heat exchanger second inlet for receiving at least a portion of the heat transfer fluid from the third reaction vessel outlet flow, the second heat exchanger second inlet being in fluid communication with the third reaction vessel outlet;
   a second heat exchanger first outlet for providing at least a portion of the heat transfer fluid from the third reaction vessel outlet flow to the second reaction vessel inlet flow, the second heat exchanger first outlet being in fluid communication with a fourth reaction vessel inlet of the reaction vessel; and
   a second heat exchanger second outlet for allowing at least a portion of the second reaction product from the second reaction vessel outlet flow to exit the second heat exchanger.

10. The reactor system of claim 9, wherein the second heat exchanger second inlet is configured to provide liquid droplets of at least a portion of the heat transfer fluid from the third reaction vessel outlet flow to the second heat exchanger to facilitate the transfer of thermal energy from the second reaction vessel outlet flow to the second reaction vessel inlet flow.

11. The reactor system of claim 1, wherein the first heat exchanger further comprises a first channel comprising the first reaction vessel outlet flow, the first channel having a plurality of protrusions extending from interior side walls of the first channel, the protrusions configured to reduce contact between at least a portion of the first reaction product of the first reaction vessel outlet flow and at least a portion of the interior side walls of the first channel.

12. The reactor system of claim 11, wherein the first channel is configured to reduce contact between at least a portion of the first reaction product of the first reaction vessel outlet flow and at least a portion of the interior side walls of the first channel by producing eddy currents within the first channel.

13. The reactor system of claim 11, wherein the first channel is positioned at an angle sufficient to promote gravitationally driven flow of the first reaction vessel outlet flow.

14. The reactor system of claim 11, wherein the first heat exchanger further comprises a second channel comprising the first reaction vessel inlet flow, the second channel being in thermal communication with the first channel to facilitate the transfer of thermal energy from the first reaction vessel outlet flow to the first reaction vessel inlet flow.

15. The reactor system of claim 11, wherein the first heat exchanger further comprises a recovery vessel comprising:
a recovery vessel inlet for receiving the first reaction vessel outlet flow, the recovery vessel inlet being in fluid communication with the first reaction vessel outlet;
a first recovery vessel outlet for providing at least a portion of the first reaction product from the first reaction vessel outlet flow; and
a second recovery vessel outlet for providing at least a portion of the heat transfer fluid from the first reaction vessel outlet flow to the first reaction vessel inlet flow, the second recovery vessel outlet being in fluid communication with the second reaction vessel inlet.

16. A reactor system comprising:
a reaction vessel comprising a reactant, a heat transfer fluid, and a first reaction product, wherein the heat transfer fluid has a greater density than the first reaction product such that at least a portion of the first reaction product floats on a surface of the heat transfer fluid;
a first reaction vessel outlet positioned at a surface level of the first reaction product, the first reaction vessel outlet configured to output a first reaction vessel outlet flow comprising at least a portion of the first reaction product and at least a portion of the heat transfer fluid; and
a first heat exchanger comprising:
the first reaction vessel outlet flow, the first reaction vessel outlet flow being at a first temperature; and
a first reaction vessel inlet flow comprising at least a portion of the heat transfer fluid of the third reaction vessel outlet flow, the first reaction vessel inlet flow being at a second temperature that is less than the first temperature; and
wherein thermal energy in the first reaction vessel outlet flow is transferred to the first reaction vessel inlet flow;
wherein the first heat exchanger further comprises a first channel comprising the first reaction vessel outlet flow, the first channel having a plurality of protrusions extending from interior side walls of the first channel, the protrusions configured to reduce contact between at least a portion of the first reaction product of the first reaction vessel outlet flow and at least a portion of the interior side walls of the first channel.

17. The reactor system of claim 16, wherein the first channel is configured to reduce contact between at least a portion of the first reaction product of the first reaction vessel outlet flow and at least a portion of the interior side walls of the first channel by producing eddy currents within the first channel.

18. The reactor system of claim 16, wherein the first channel is positioned at an angle sufficient to promote gravitationally driven flow of the first reaction vessel outlet flow.

19. The reactor system of claim 16, wherein the first heat exchanger further comprises a second channel comprising the first reaction vessel inlet flow, the second channel in thermal communication with the first channel to facilitate the transfer of thermal energy from the first reaction vessel outlet flow to the first reaction vessel inlet flow.

20. The reactor system of claim 16, wherein the first heat exchanger further comprises a recovery vessel comprising:
a recovery vessel inlet for receiving the first reaction vessel outlet flow, the recovery vessel inlet in fluid communication with the first reaction vessel outlet;
a first recovery vessel outlet for providing at least a portion of the first reaction product from the first reaction vessel outlet flow; and
a second recovery vessel outlet for providing at least a portion of the heat transfer fluid from the first reaction vessel outlet flow to the first reaction vessel inlet flow, the second recovery vessel outlet being in fluid communication with a second reaction vessel inlet.

21. The reactor system of claim 16, wherein the heat transfer fluid is a liquid metal selected from the group consisting of liquid tin, liquid gallium, liquid indium, liquid lead, liquid bismuth, liquid aluminum, and liquid silicon; and
wherein the reaction vessel comprises a material selected from the group consisting of a ceramic, a carbon allotrope, and a carbon composite.

22. The reactor system of claim 16, wherein the reaction vessel comprises a material stable at a temperature of from 1000° C. to 3000° C.;
wherein the reactant is methane; and
wherein the first reaction product is at least one of carbon black and pyrolytic carbon.

* * * * *